(12) United States Patent
Kaltenbach et al.

(10) Patent No.: US 9,409,473 B2
(45) Date of Patent: Aug. 9, 2016

(54) DEVICE FOR A DRIVETRAIN OF A HYBRID VEHICLE, DRIVETRAIN AND METHOD FOR OPERATING THE SAME

(71) Applicant: ZF Friedrichshafen AG, Friedrichshafen (DE)

(72) Inventors: Johannes Kaltenbach, Friedrichshafen (DE); Kai Borntrager, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 841 days.

(21) Appl. No.: 13/654,459

(22) Filed: Oct. 18, 2012

(65) Prior Publication Data

US 2013/0109530 A1   May 2, 2013

(30) Foreign Application Priority Data

Oct. 26, 2011   (DE) .................. 10 2011 085 199

(51) Int. Cl.

| | |
|---|---|
| *B60K 6/48* | (2007.10) |
| *B60K 6/387* | (2007.10) |
| *B60K 6/547* | (2007.10) |
| *B60W 10/06* | (2006.01) |
| *B60W 10/08* | (2006.01) |
| *B60W 20/00* | (2016.01) |
| *B60K 6/365* | (2007.10) |

(Continued)

(52) U.S. Cl.
CPC ............. *B60K 6/387* (2013.01); *B60K 6/365* (2013.01); *B60K 6/48* (2013.01); *B60K 6/547* (2013.01); *B60W 10/06* (2013.01); *B60W 10/08* (2013.01); *B60W 20/00* (2013.01); *B60W 30/18027* (2013.01); *F16H 3/126* (2013.01); *B60Y 2400/421* (2013.01); *F16H 3/006* (2013.01); *F16H 2200/0056* (2013.01); *F16H 2200/2005* (2013.01); *Y02T 10/6221* (2013.01); *Y02T 10/6286* (2013.01); *Y10T 477/26* (2015.01)

(58) Field of Classification Search
CPC .......... B60K 6/365; B60K 6/387; B60K 6/48; F16H 3/725
See application file for complete search history.

(56) References Cited

U.S. PATENT DOCUMENTS 6,805,648 B1 *   10/2004   Ehrlinger ................. B60K 6/38
                                                                475/5
8,075,436 B2 *   12/2011   Bachmann ............. B60K 6/365
                                                              475/209

(Continued)

FOREIGN PATENT DOCUMENTS

DE          199 34 696 A1     5/2001
DE     10 2006 059 591 A1     6/2008

*Primary Examiner* — Derek D Knight
(74) *Attorney, Agent, or Firm* — Davis & Bujold, PLLC; Michael J. Bujold

(57) ABSTRACT

A device for a drive train of a hybrid vehicle having a planetary gear set which comprises a carrier element, a sun gear element, and a ring gear element. A first element connects to a first input shaft of a first subtransmission of a transmission, and a second element connects to an electric machine of a hybrid drive. A first shift element which couples, in a first shift position, a third of the elements to a second input shaft of a second subtransmission of the transmission, to which an internal combustion engine can be coupled, and, in a second shift position, can be coupled to another element of the planetary gear set, and having a second shift element which couples the input shafts of both subtransmissions when engaged and separates the input shafts of both subtransmissions when disengaged.

17 Claims, 8 Drawing Sheets

(51) Int. Cl.
*B60W 30/18* (2012.01)
*F16H 3/12* (2006.01)
*F16H 3/00* (2006.01)

(56) References Cited

U.S. PATENT DOCUMENTS

| | | | | |
|---|---|---|---|---|
| 8,241,174 B2* | 8/2012 | Wallner | ............... | B60K 6/365 477/5 |
| 8,585,522 B2* | 11/2013 | Kaltenbach | ........... | B60W 10/06 475/218 |
| 8,684,875 B2* | 4/2014 | Kaltenbach | ............ | B60K 6/365 475/5 |
| 8,696,506 B2* | 4/2014 | Kaltenbach | ............ | B60K 6/387 475/151 |
| 8,784,245 B2* | 7/2014 | Ideshio | ................... | B60K 6/36 475/5 |
| 8,911,315 B2* | 12/2014 | Kaltenbach | ............ | B60K 6/365 475/4 |
| 8,961,345 B2* | 2/2015 | Kaltenbach | ............. | F16H 3/126 475/5 |
| 9,162,667 B2* | 10/2015 | Cho | ...................... | B60W 20/00 |
| 9,168,918 B2* | 10/2015 | Lee | ...................... | B60W 20/30 |

\* cited by examiner

DEVICE FOR A DRIVETRAIN OF A HYBRID VEHICLE, DRIVETRAIN AND METHOD FOR OPERATING THE SAME

This application claims priority from German patent application serial no. 10 2011 085 199.2 filed Oct. 26, 2011.

FIELD OF THE INVENTION

The invention relates to a device for a drive train of a hybrid vehicle, a drive train of a hybrid vehicle having such a device and methods for the operation thereof.

BACKGROUND OF THE INVENTION

A drive train of a hybrid vehicle is known from the document DE 10 2006 059 591 A1, the drive assembly of which is formed as a hybrid drive and comprises an internal combustion engine and an electric machine. The drive train known from prior art comprises, in addition to the hybrid drive, a transmission having two subtransmissions connected in parallel, wherein the transmission comprises two transmission input shafts and one transmission output shaft. The drive train known from prior art further comprises a device which is used to connect the electric machine of the hybrid drive to the transmission, wherein this device comprises a planetary gear set which has a carrier, a sun gear and a ring gear as elements. The electric machine of the hybrid drive is in fixed connection to an element of the planetary gear set, namely to the sun gear, wherein a second element of the planetary gear set, namely a carrier thereof, is in fixed connection to a first transmission input shaft of a first subtransmission of the transmission. A third element of the planetary gear set, namely the ring gear thereof, is in fixed connection to a second transmission input shaft of a second subtransmission of the transmission, wherein further the internal combustion engine of the hybrid drive can be coupled, via a separating clutch, to this second transmission input shaft. With such a drive train, a defined functional scope can be provided for a hybrid vehicle. There is a need for a drive train of a hybrid vehicle and for a device for such a drive train of a hybrid vehicle, using which the functional scope of a hybrid vehicle can be expanded.

SUMMARY OF THE INVENTION

Proceeding from this background, the problem solved by the present invention is to create a novel device for a drive train of a hybrid vehicle and a novel drive train and methods for the operation thereof.

This problem is solved according to a first aspect of the invention by a device that comprises a planetary gear set having the elements of a carrier, sun gear and ring gear, wherein a first element of these elements of the planetary gear set serves for the fixed connection to a first transmission input shaft of a first subtransmission of a transmission, and wherein a second element of these elements of the planetary gear set serves for the fixed connection to an electric machine of a hybrid drive. Furthermore according to this, the device comprises a first shift element via which a third element of these elements of the planetary gear set in a first shift position of the first shift element can be coupled to a second transmission input shaft of a second subtransmission of the transmission, to which further an internal combustion engine of the hybrid drive can be connected, and in a second shift position of the first shift element can be coupled to another of the elements of the planetary gear set, and a second shift element by means of which with an engaged second shift element both transmission input shafts of both subtransmissions can be coupled to each other, and with a disengaged second shift element both of the transmission input shafts of the two subtransmissions can be separated from each other.

This problem is solved according to a second aspect of the invention by a device that comprises a planetary gear set having the elements of a carrier, sun gear and ring gear, wherein a first element of these elements of the planetary gear set serves for the fixed connection to a first transmission input shaft of a first subtransmission of a transmission, and wherein a second element of the elements of the planetary gear set serves for the fixed connection to a second transmission input shaft of a second subtransmission of the transmission, to which further an internal combustion engine of the hybrid drive can be coupled. Further, accordingly, the device comprises a first shift element by means of which an electric machine of a hybrid drive in a first shift position of the first shift element can be coupled to a third element of these elements of the planetary gear set, and in a second shift position of the first shift element can be coupled to the first transmission input shaft of the first subtransmission, and a second shift element by means of which, with an engaged second shift element, both transmission input shafts of the two subtransmissions can be coupled to each other, and with a disengaged second shift element, both the transmission input shafts of the two subtransmissions can be separated from each other.

Both aspects of the invention allow a change, or a shift, between an EDS (first) operating mode, or an operating mode of an electrodynamic drive system, and an ISG (second) operating mode, or an operating mode of an integrated starter generator, wherein in the EDS operating mode the planetary gear set serves respectively as a superposition transmission. According to the first aspect of the invention, in ISG operating mode the planetary gear set is bypassed in block rotation as a whole, whereas in contrast according to the second aspect of the invention, in ISG operating mode the planetary gear set runs idle or without torque. The devices according to the first aspect and the second aspect of the invention allow an expansion of the functional scope of a hybrid vehicle.

BRIEF DESCRIPTION OF THE DRAWINGS

Preferred further developments of the invention will become apparent from the description that follows. Embodiments of the invention are explained in greater detail with reference to the drawings, without being limited thereto. The figures show.

DETAILED DESCRIPTION OF THE PREFERRED EMBODIMENTS

Figure 1:
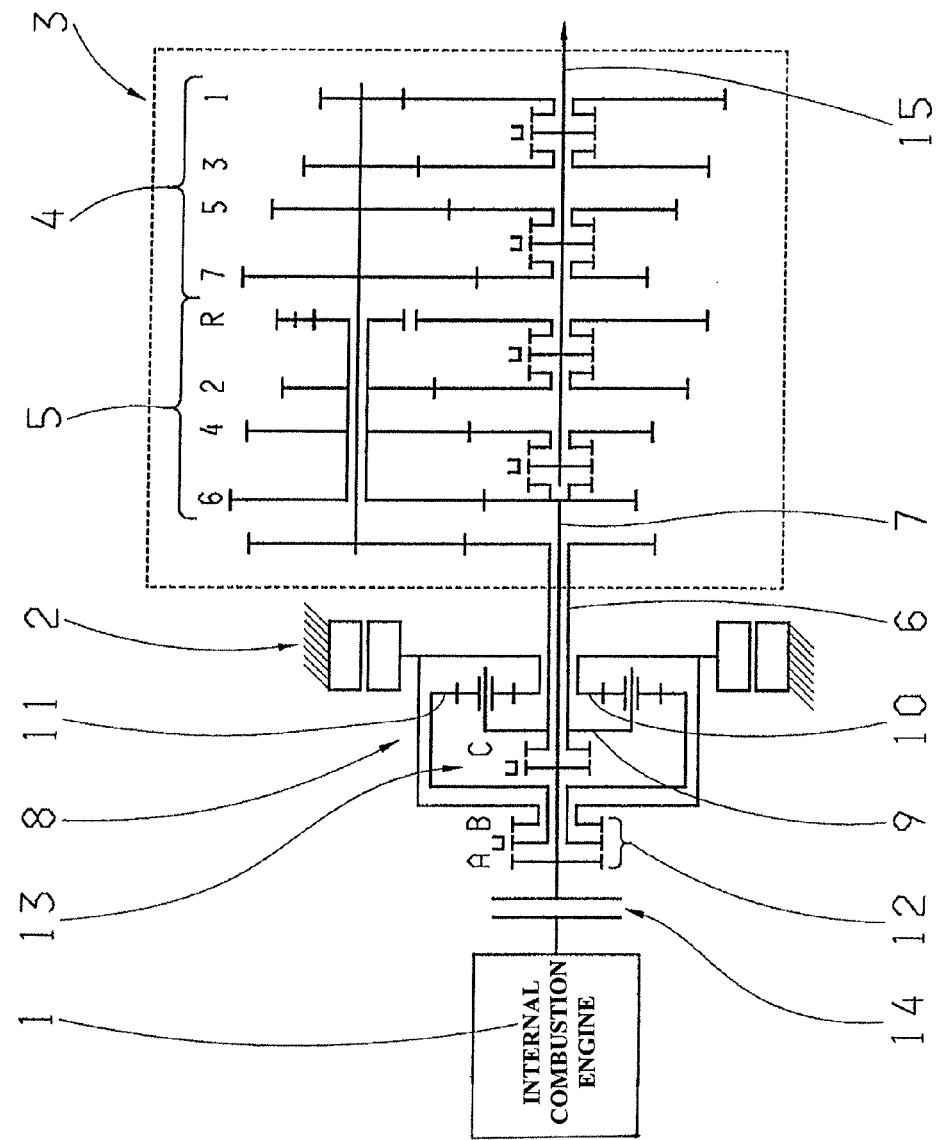
FIG. 1 a diagram of a drive train according to the invention with a device according to the invention according to a first example embodiment of the first aspect of the invention.

FIG. 1 shows a preferred example embodiment of a drive train of a hybrid drive, wherein the drive train of FIG. 1 comprises a hybrid drive that is provided with an internal combustion engine 1 and an electric machine 2. The drive train of FIG. 1 further comprises a transmission 3 having to two subtransmissions 4 and 5 connected in parallel to each other, wherein in the example embodiment of FIG. 1 the first subtransmission 4 provides the forward gears "1", "3", "5" and "7", and wherein the second subtransmission 5 provides the forward gears "2", "4" and "6" and the reverse gear "R".

The transmission 3 shown as an example in FIG. 1 with the two subtransmissions 4 and 5 is a seven-speed double clutch transmission. This transmission is however not mandatory for the invention. Other transmissions having two subtransmissions connected in parallel can also be used.

The transmission 3 comprises two transmission input shafts 6 and 7, namely a first transmission input shaft 6 interacting with the first subtransmission 4 and a second transmission input shaft 7 interacting with the second subtransmission 5. The first transmission input shaft 6 in the example embodiment shown is implemented as a hollow shaft, in which the second transmission input shaft 7 passes. In addition, the transmission 3 has a single transmission output shaft 15.

The drive train of FIG. 1 comprises a device for connecting the electric machine 2 to the transmission 3, wherein the device has at least one planetary gear set 8 with the three elements, or the three shafts, carrier 9, sun gear 10 and ring gear 11.

A first element of the three elements 9, 10 and 11 of the planetary gear set 8, the carrier 9 in the example embodiment shown of FIG. 1, serves according to a first aspect of the invention for the fixed connection to the first transmission input shaft 6 of the first subtransmission 4 of the transmission 3. Accordingly, in the drive train of FIG. 1, the first transmission input shaft 6 of the first subtransmission 4 is in fixed connection to the carrier 9 of the planetary gear set 8.

A second element of the elements 9, 10 and 11 of the planetary gear set 8 serves according to the first aspect of the invention for the fixed connection to the electric machine 2 of the hybrid drive, wherein in FIG. 1 this second element of the planetary gear set 8 is the sun gear 10. Accordingly, in FIG. 1, the electric machine 2 is in fixed connection to the sun gear 10.

In addition to the planetary gear set 8, the device of the drive train of FIG. 1 comprises a first shift element 12 having at least two shift positions A and B, wherein according to the first aspect of the invention in the first shift position A of the first shift element 12 a third element of the elements 9, 10 and 11 of the planetary gear set 8, namely in FIG. 1 the ring gear 11, is coupled to the second transmission input shaft 7 of the second subtransmission 5 of the transmission 3, and wherein in a second shift position B of the first shift element 12, the third element of the planetary gear set 8, namely in FIG. 1 the ring gear 11 thereof, is coupled to another of the elements of the planetary gear set 8, namely in FIG. 1 to the sun gear 10 thereof.

According to an advantageous further development of the invention, the first shift element 12, in addition to the two engaged shift positions A and B, further comprises a third, disengaged shift position in which the third element of the planetary gear set 8, namely the ring gear 11 in FIG. 1, can rotate freely.

In addition, the device of the drive train of FIG. 1 comprises a second shift element 13, wherein the second shift element 13 has a first, engaged shift position C and a second, disengaged shift position. With the second shift element 13 engaged, the two transmission input shafts 6 and 7 of the two subtransmissions 4 and 5 are coupled together, such that they have forced equal rotational speeds. With the second shift element 13 engaged, the first element of the planetary gear set 8, in FIG. 1 the carrier 9 thereof, is connected both to the first transmission input shaft and to the second transmission input shaft 7 of the two subtransmissions 4 and 5 of the transmission 3. With the second shift element 13 disengaged, both transmission input shafts 6 and 7 of the subtransmissions 4 and 5 are separated from each other such that there is no forced equal rotational speed of the shafts.

Accordingly, in the disengaged position of the second shift element 13, the first element of the planetary gear set 8, namely in FIG. 1 the carrier 9, is coupled only to the first transmission input shaft 6 of the first subtransmission 4.

Furthermore the drive train of FIG. 1 comprises a separating clutch 14, wherein the separating clutch 14 is an optional assembly. The internal combustion engine 1 can be coupled to, as well as decoupled from, the second transmission input shaft 7 of the second subtransmission 5 of the transmission 3 via the separating clutch 14.

Figure 2:
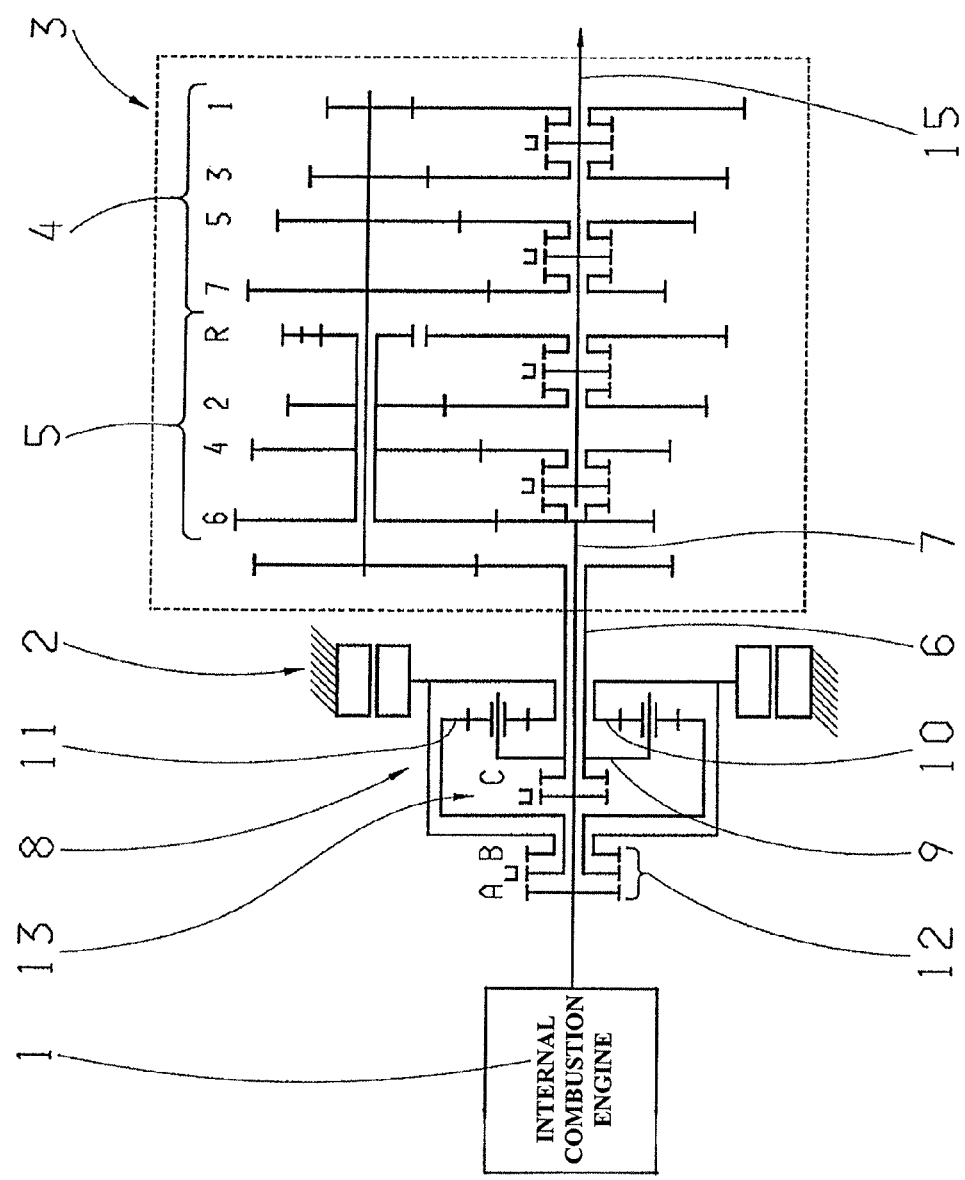
FIG. 2 a diagram of a drive train according to the invention with a device according to the invention according to a second example embodiment of the first aspect of the invention.

FIG. 2 shows a variant embodiment of the invention in which there is no separating clutch 14, but which with respect to the remaining details however coincides with the example embodiment of FIG. 1. Accordingly, in FIG. 2 the internal combustion engine 1 is coupled without a clutch to the second transmission input shaft 7 of the second subtransmission 5.

If the separating clutch 14 is present, with the separating clutch 14 disengaged the electric machine 2 can also use the gears of the second subtransmission 5 for purely electric travel.

If in contrast, the separating clutch 14 is not present as is shown in FIG. 2, then the electric machine 2 can use only the gears of the first subtransmission 4 for purely electric travel with a disengaged internal combustion engine 1.

If the first shift element 12 of FIG. 1 is in the first shift position A, the planetary gear set 8 acts as a superposition transmission in an EDS operating mode, or an operating mode of an electrodynamic drive system.

With the engaged shift position A of the first shift element 12, with an engaged separating clutch 14 for example, with a gear engaged in the first subtransmission 4 and with the second subtransmission 5 in neutral, a startup can be performed electrodynamically in the EDS operating mode, thus with generator operation of the electric machine 2 in order to more strongly charge an electric energy store. In this case, the second shift element 13 serves as a bypass shift element after completing the startup operation such that the planetary gear set 8 can be brought into block rotation as a whole.

Furthermore, if the first shift element 12 takes on the first shift position A, power shifting can be performed at the drive train with speed superimposition of the internal combustion engine 1 and the electric machine 2. Thus, the electric machine 2 can support torque of the internal combustion engine 1 at the planetary gear set 8 with variable speed. The internal combustion engine 1 and the electric machine 2 then act together on the transmission output shaft 15, the electric machine 2 can be operated either as a motor or generator.

If the second shift element 12 of FIG. 1 takes on the second shift position B, according to the first aspect of the invention the planetary gear set 8 is bypassed in an ISG operating mode, or an operating mode of an integrated starter generator in block rotation as a whole.

With an engaged shift position B of the first shift element 12, using an electric machine 2 operating as a motor, a purely electric start up can then be performed, namely with strong discharging of an electric energy store. Here, the planetary gear set 8 does not act as a constant transmission ratio, because it is bypassed. Therefore, energy losses due to rolling motion in the planetary gear set 8 can be avoided, as can excessive speed at the electric machine 2.

Furthermore, in the engaged shift position B of the first shift element 12, power shifting can be performed in which the electric machine 2 provides torque at the output during the shifting by discharging an electric energy store. In this case, the internal combustion engine 1 does not contribute to the output torque at the transmission output shaft 15.

A shifting strategy for the first shift element 12 provides that when the hybrid vehicle is at a standstill or traveling at low travel speed, the first shift element 12 is engaged in, or takes on, shift position B, when the charge state of an electric energy store, acting together with the electric machine 2, is greater than a defined limit value. This defined limit value for the charge state of the electric energy store is selected preferably such that purely electric travel is possible from standstill with the electric machine 2 operating as a motor, and with a first shift element 12 in the second shift position B.

If the charge state of the electric energy store is less than the limit value, the first shift element 12 is engaged in, or takes on, shift position A in order to start up, electrodynamically, free of wear, in generator operation of the electric machine 2 even at low charge states of the electric energy store.

The shift position B can also be selected at the first shift element 12 when travel is to be purely electric with a switched-off internal combustion engine 1. In this case, the gears of the second subtransmission 5 are available for the internal combustion engine 1 for the startup thereof.

Furthermore, the shift position B is selected at the first shift element 12, preferably during braking via the electric machine 2, thus during regeneration, so that the internal combustion engine 1 can be decoupled and switched off, namely by disengaging the separating clutch 14 and switching off the internal combustion engine 1.

The shift position A for the first shift element 12 is selected in particular with implementation of power shifting in the hybrid operation of the drive train, namely in particular when a less powerful electric machine is used as the electric machine 2. When the shift position A is engaged at the first shift element 12, greater drive torque can be provided at the transmission output shaft 15 when shifting, because the internal combustion engine 1 can continuously provide power via the planetary gear set 8. In contrast in shift position B, the electric machine 2 alone must maintain the tractive force of the transmission output shaft 15. Further, if shift position A is selected for the first shift element 12, the internal combustion engine 1 has a uniform torque progression while performing power shifting using the planetary gear set 8, whereby emissions can be reduced. When the shift position B is engaged at the first shift element 12, while performing power shifting there is a load reduction at the internal combustion engine 1 and subsequently after performing the power shift a load increase, whereby higher emissions can result.

When the first shift element 12 in addition to the shift position A and the shift position B also has a third shift position in which the third element of the planetary gear set 8, namely in FIG. 1 the ring gear 12, can rotate freely, then this third shift position is selected at the first shift element 12 in particular at a constant travel speed of the hybrid vehicle, thus when little generator-produced energy is required, because in this shift position the electric machine 2 can be decoupled for avoiding no-load losses and can be placed at standstill. Furthermore this third shift position of the first shift element 12 can be selected in the case of a failure of the electric machine, so that in the case of a failure drive operation is possible using only the internal combustion engine 1.

Further special features of the drive train of FIG. 1 consist in that the first subtransmission 4 can always be synchronized using a speed-regulated electric machine 2, either directly in shift position B of the first shift element 12, or indirectly using the planetary gear set 8 in the shift position A of the first shift element 12.

The second subtransmission 5 is either synchronized with a disengaged separating clutch 14 and a disengaged second shift element 13 by synchronization in the transmission 3, or by a speed-regulation of the internal combustion engine 1 with at least partial engagement of the separating clutch 14 with a disengaged second shift element 13, or with power shifting in EDS operating mode by a speed-regulation of the electric machine 2.

In the example embodiment shown in FIG. 1, the first shift element 12 is built as a form-locking shift element, just as the second shift element 13 is built as a form-locking shift element. The separating clutch 14 in FIG. 1 is designed as a frictionally engaging separating clutch.

It is pointed out here that the separating clutch 14, which as already mentioned is an optional assembly, can also be built as a form-locking dog clutch for reasons of construction space and cost. In this case, an electrodynamic startup with an engaged shift position B of the first shift element 12 is nevertheless possible, because in this case the separating clutch 14 is engaged anyway.

A purely internal combustion engine driven startup without the electric machine 2 and disengagement of the drive train under load, for example with a complete braking of the drive train, is however possible only if the separating clutch 14 is designed as a frictionally engaging clutch.

Before describing preferred methods for operating the drive train or a device of such a drive train, the variants of the first aspect of the invention will be described with reference to FIG. 2 to FIG. 7.

As already explained, FIG. 2 shows a variant of FIG. 1 in which there is no separating clutch 14, that is, in which the internal combustion engine 1 is coupled without a clutch to the second input shaft 7 of the second subtransmission 5. In this case, the electric machine 1 can use only the gears of the first subtransmission 4 for purely electric travel with the internal combustion engine 1 switched off. In this case, the internal combustion engine 1 is decoupled from the transmission output shaft 15 via a disengaged second shift element 13, by a second subtransmission 5 in the neutral position. In the variant of FIG. 2, the second subtransmission 5 can be synchronized either by speed-regulation at the internal combustion engine 1 or by electrodynamic power shifting using the planetary gear set 8, which acts as a superposition transmission in the shift position A.

In the example embodiment of FIG. 2, a purely internal combustion engine driven startup is not possible using the internal combustion engine 1 without the electric machine 2 also rotating. Also under certain circumstances it might not be possible to disengage the drive train under load, for example during complete braking.

In the variant of FIG. 2, an additional starter device can be present, because it may not be possible to tow-start the internal combustion engine 1 using the electric machine 2.

Figure 3:
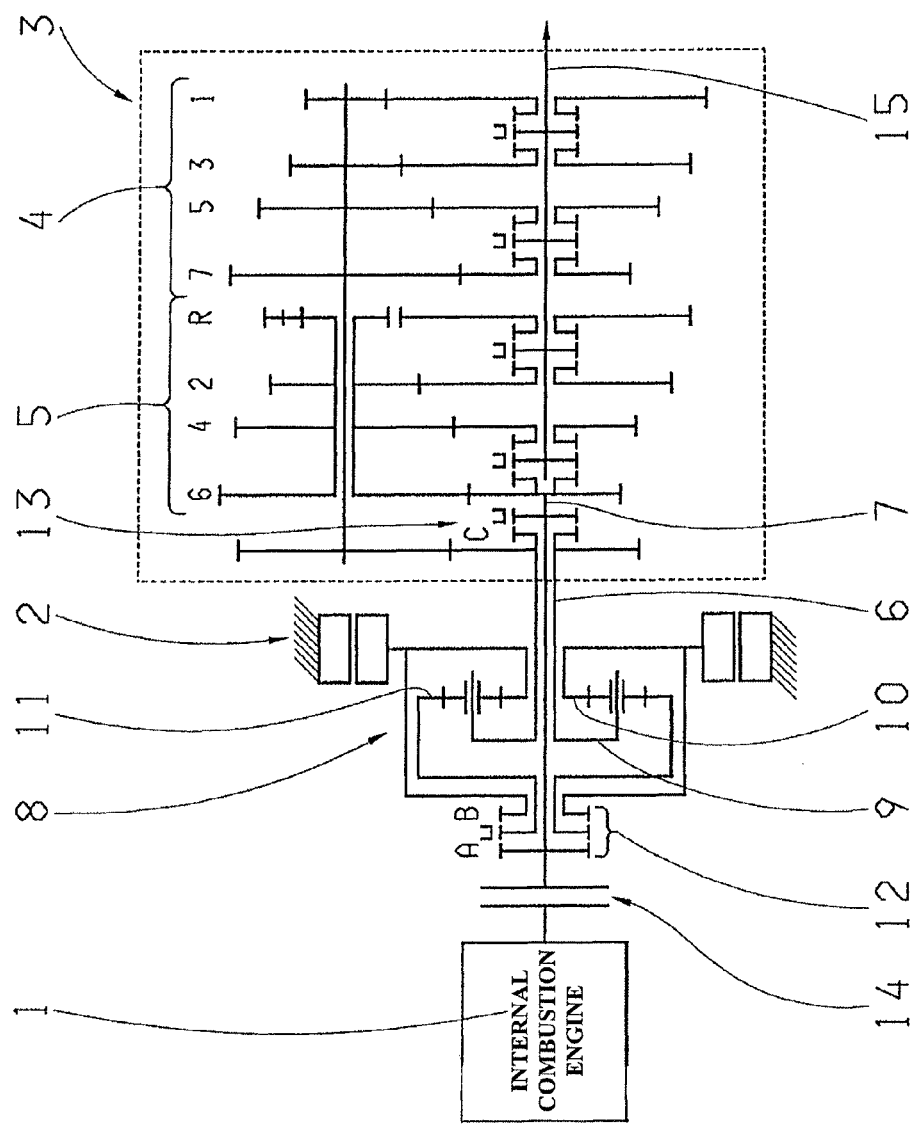
FIG. 3 a diagram of a drive train according to the invention with a device according to the invention according to a third example embodiment of the first aspect of the invention.

FIG. 3 shows a variant of the invention in which, in contrast to the example embodiment of FIG. 1, the second shift element 13 is integrated into a gear set of the transmission 3. This integration of the second shift element 13 into a gear set of the transmission 3 is advantageous, because in this case the second shift element 13 is accessible from outside without a rotary feedthrough. In the variants of FIGS. 1 and 2, a rotary feedthrough is required for actuating the second shift element 13.

Figure 4:
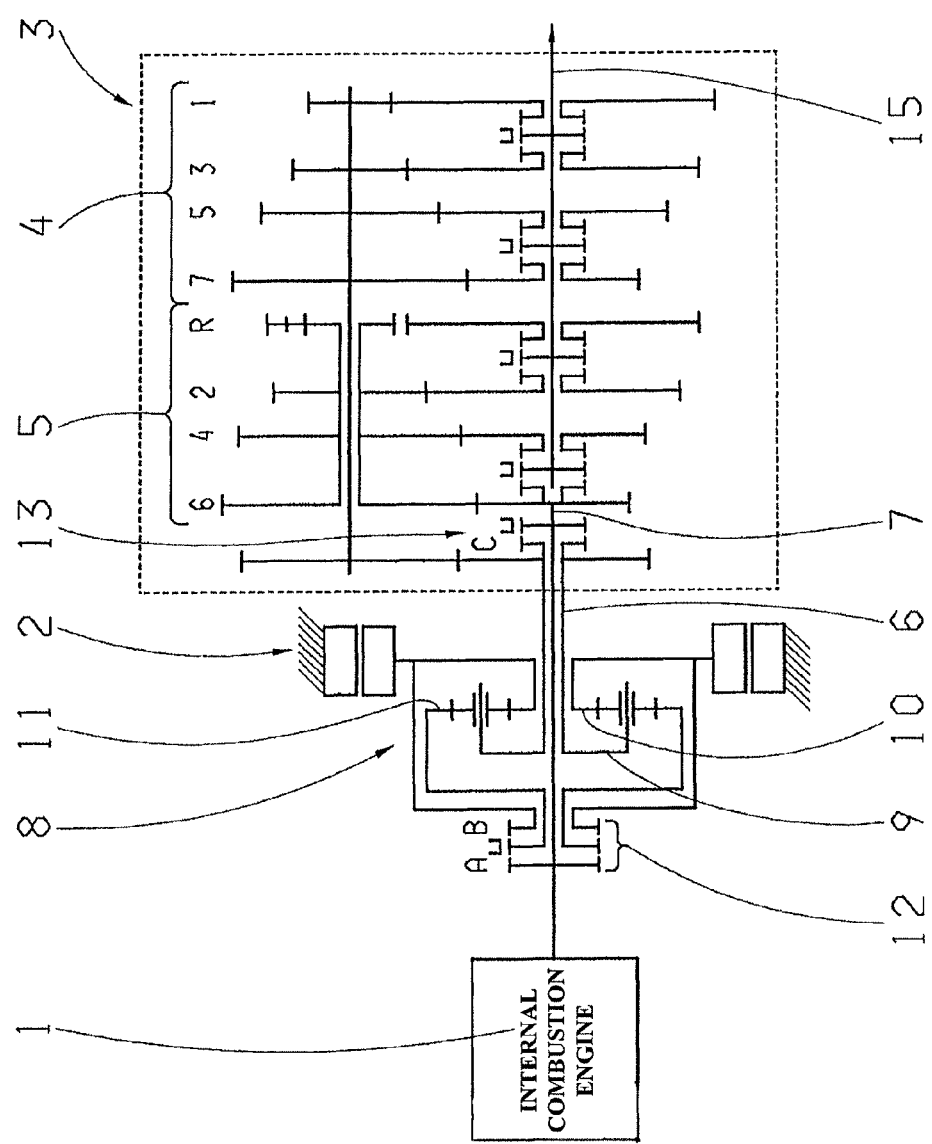
FIG. 4 a diagram of a drive train according to the invention with a device according to the invention according to a fourth example embodiment of the first aspect of the invention.

In the variant of FIG. 4, which substantially corresponds to the variant of FIG. 2, the second shift element 13, consistent with the variant of FIG. 3, is also integrated into a gear set of the transmission 3. The variant of FIG. 4 accordingly corresponds to the variant of FIG. 3 without a separating clutch 14.

Figure 5:
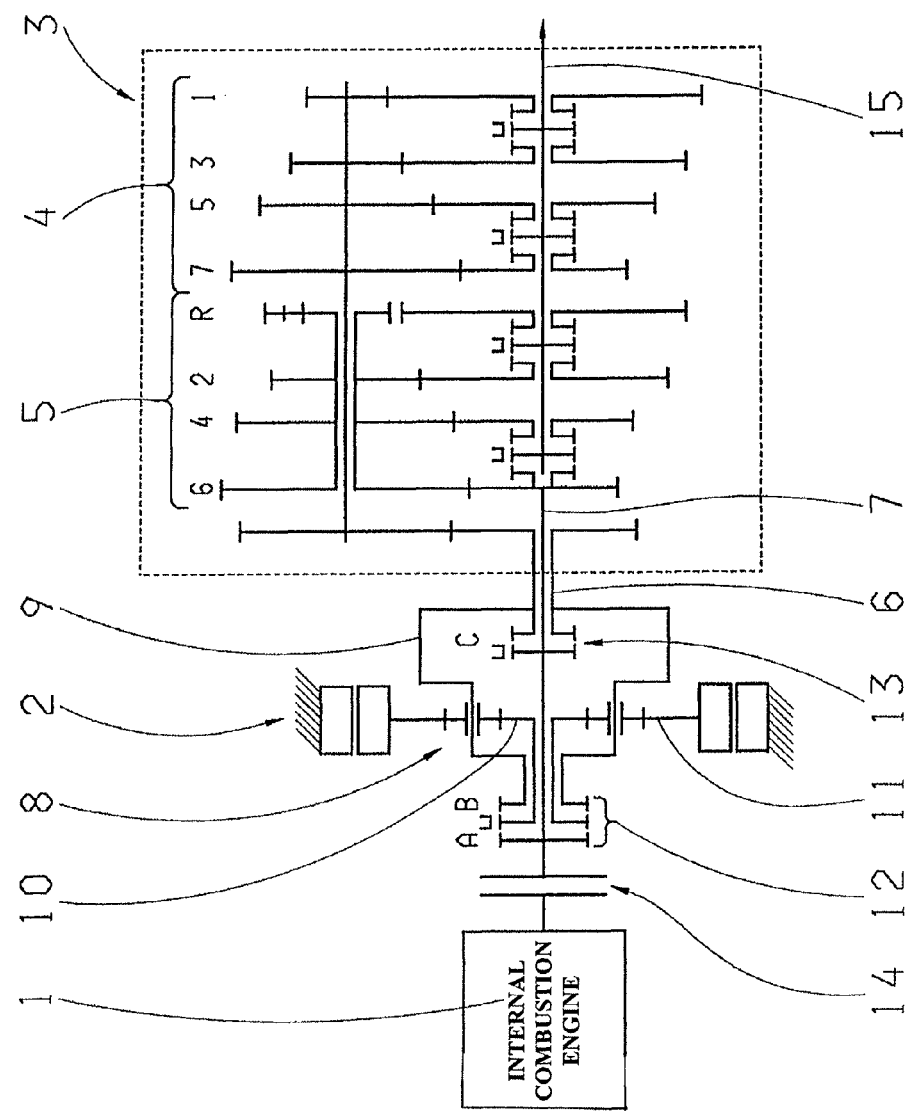
FIG. 5 a diagram of a drive train according to the invention with a device according to the invention according to a fifth example embodiment of the first aspect of the invention.

A further variant of the invention is shown in FIG. 5, wherein the connection of the planetary gear set 8 differs in the variant of FIG. 5.

Thus, in the variant of FIG. 5, the first element of the planetary gear set 8 which is in a fixed connection to the first transmission input shaft 6 of the first subtransmission 4, is the carrier 9 of the planetary gear set 8. In FIG. 5, the second element of the planetary gear set that is in fixed connection to the electric machine 2 is the ring gear 11. In the variant of FIG. 5, the third element, which depending on the shift position of the first shift element 12, is connected in the shift position A thereof to the second transmission input shaft 7 and in the shift position B thereof is in fixed connection to the housing, is the sun gear 10.

The variant of FIG. 5 is particularly advantageous when the drive train has an electric machine 2 which can provide high torque, in which drive train the internal combustion engine 1 however is low-torque.

In the variant of FIG. 5, the second shift element 13 is positioned outside of the transmission 3.

Figure 6:
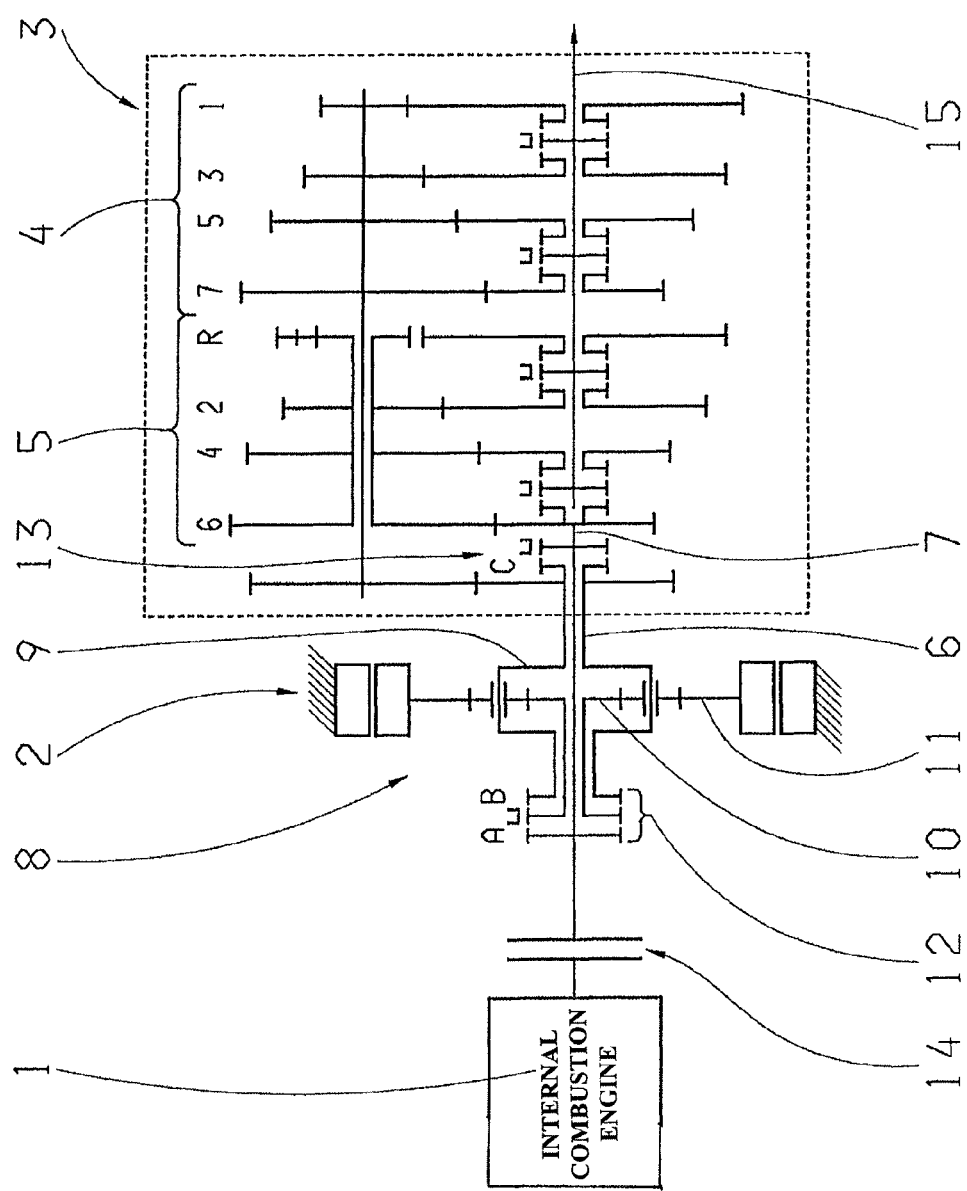
FIG. 6 a diagram of a drive train according to the invention with a device according to the invention according to a sixth example embodiment of the first aspect of the invention.

In FIG. 6, which corresponds to the variant of FIG. 5 with respect to the connection of the planetary gear set 8, the second shift element 13 is again integrated into the transmission 3.

Further, in the variants of FIGS. 5 and 6 the separating clutch 14 can be omitted.

Furthermore, although it is not shown, another connection of the planetary gear set 8 is also conceivable. In particular when the planetary gear set 8 is designed as a so-called plus gear set, the electric machine 2 can be in a fixed coupling to the sun gear of the planetary gear set, and the first transmission input shaft 6 can be in a fixed coupling to the ring gear 10 of the planetary gear set, the carrier of the planetary gear set is then coupled, depending on the shift position of the first shift element 12, either to the second transmission input shaft or fixed to the housing.

Figure 7:
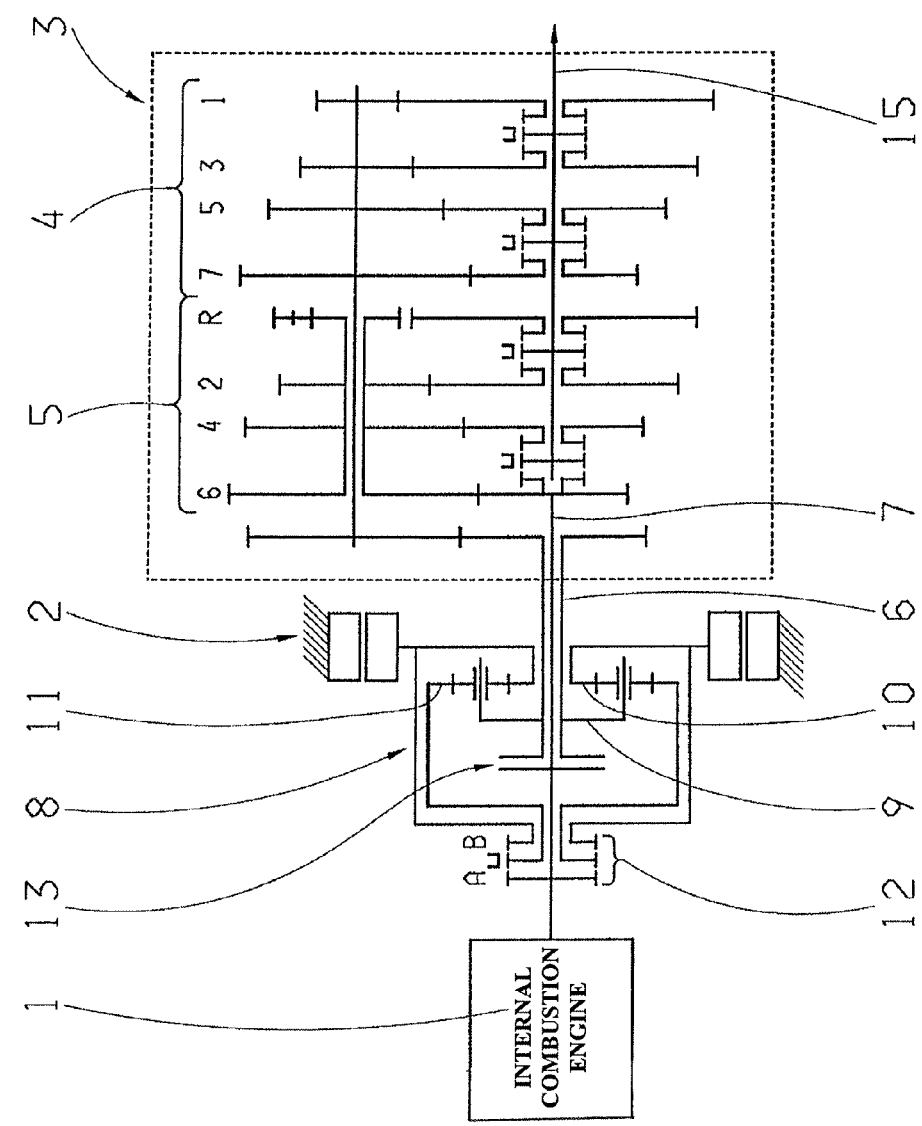
FIG. 7 a diagram of a drive train according to the invention with a device according to the invention according to a seventh example embodiment of the first aspect of the invention.

In all example embodiments of FIGS. 1 to 6, the first shift element 12 and the second shift element 13 are each designed as a form-locking dog clutch. In contrast, FIG. 7 shows a variant of the invention in which the second shift element 13 is designed as a frictionally engaging clutch. Here, the variant of FIG. 7 corresponds substantially to the variant of FIG. 2. Also in the variants of FIGS. 1 and 3 to 6, the frictionally engaging clutch shown in FIG. 7 can be used as a second shift element 13.

The preferred methods are described in the following. A first method for operating a drive train shown in FIGS. 1 to 7 or a device, which as a component of the drive train serves to connect the internal combustion engine 1, the electric machine 2 and the transmission 3, relates to the shifting of the first shift element 12 from the first shift position A into the second shift position B. According to this method, when the second shift element 13 is engaged and a gear is engaged in the first subtransmission 4, or when the second shift element 13 is disengaged and a gear is engaged in the second subtransmission 5, for shifting the first shift element 12 from the first shift position A into the second shift position B, initially the load is reduced at the electric machine 2, preferably the load is completely removed from the electric machine 2. The load previously supplied by the electric machine 2 can be completely or partially transferred to the internal combustion engine 1. Then, the first shift position A can be disengaged load-free at the first shift element 12, wherein then the second shift position B is engaged load-free, possibly after synchronizing the first shift element 12 with respect to the second shift position B using speed-regulation of the electric machine 2. When the second shift element 13 is engaged, the second shift position B is already synchronous and a tooth-on-tooth position can be resolved by changing the rotational speed of the electric machine 2. When the second shift element 13 is disengaged, synchronization occurs using the electric machine 2. With load-free shifting of the first shift element 12 from the first shift position A into the shift position B, the internal combustion engine 1 supports output torque at the transmission output shaft 15, specifically either with an engaged second shift element 13 via the first subtransmission 4, or with a disengaged second shift element 13 via the second subtransmission 5.

A second method according to the invention, relates to shifting the shift element 12 from the second shift position B into the first shift position A, namely when the second shift element 13 is engaged and a gear is engaged in the first subtransmission 4, or when the second shift element 13 is disengaged and a gear is engaged in the second subtransmission 5. In this case, for shifting the first shift element 12 from the second shift position B into the first shift position A, initially the electric machine 2 is preferably made completely load-free, and the load thereof is at least partially transferred to the internal combustion engine 1. Then, the shift position B can be disengaged load-free, and next, the first shift position A can be engaged load-free, possibly after synchronizing the first shift element 12 with respect to the first shift position A using speed regulation of the electric machine 2. Here, the internal combustion engine 1 supports the output torque of the transmission output shaft 15 of the transmission 3 either with an engaged second shift element 13 via the first subtransmission 4, or with a disengaged second shift element 13 via the second subtransmission 5.

Further methods according to the invention, relate to a drive train in which the second shift element 13 is designed as a frictionally engaging shift element 13 that can be operated with slip (see FIG. 7); namely these methods relate to shifting the first shift element 12 from the first shift position A into the second shift position B, and vice versa, from the second shift position B in to the first shift position A.

Shifting of the first shift element 12 from shift position B into shift position A without interruption of tractive force with the frictionally engaging, second shift element 13 initially disengaged occurs for example in the case of transitioning from purely electric creeping in shift position B into electrodynamic creeping in shift position A. This shifting can be necessary, for example, if creeping purely electrically using an electric machine 2 operated as a motor occurs for a long time and an electric energy store is discharged. In this case, a shift must be made to electrodynamic creeping in shift position A in order to more strongly charge the electric energy store during electrodynamic creeping with the electric machine 2 operating as a generator.

In the initial state of the method the shift element 12 is in the engaged shift position B, the second shift element 13 is disengaged, the internal combustion engine 1 is running, a gear is engaged in the first subtransmission 4, and the second subtransmission 5 is in neutral. Starting from this initial state, first, load is transferred from the electric machine 2 to the second shift element 13 in that the second shift element 13 is at least partially engaged, and in particular is operated with slip at low travel speeds, wherein the internal combustion engine 1 preferably completely takes over the torque provided by the electric machine 2. Accordingly, there is a complete reduction of load, or reduction of torque, at the electric machine 2, wherein subsequently the second shift element B can be disengaged load-free. After that, the first shift element 12 is synchronized with respect to shift position A using a speed-regulated electric machine 2 such that the shift element 12 takes on the current speed of the internal combustion engine 1 with respect to the shift position A, wherein subsequently the shift position A can be engaged load-free at the first shift element 12. Then, load builds up at the electric machine 2 so that the second shift element 13 becomes load-free. Here, the electric machine 2 supports the torque provided by the internal combustion engine 1 such that torque is no longer conducted via the second shift element 13. The internal combustion engine torque of the internal combustion engine 1 is preferably reduced here so that the transmission input torque is not increased. In the process the planetary gear set 8 acts with a transmission ratio, the shift element 13 without a transmission ratio. Then, the shift element 13 can be disengaged, and EDS operation can occur.

A reverse transfer of the first shift element 12 from shift position A into the shift position B without interruption of tractive force with the frictionally engaging second shift element 13 initially disengaged can for example be performed in the event of a transition from electrodynamic creeping into electric creeping, wherein this occurs particularly when creeping electrodynamically with the electric machine 2 operated as a generator occurred for a long period, and the electric energy store was too strongly charged. In this case, a transfer into purely electric creeping with the electric machine 2 operated as a motor can occur in order to discharge the electric energy store more strongly.

In the initial state of this method, accordingly the first shift element 12 is engaged in shift position A, the second shift element 13 is disengaged, the internal combustion engine 1 is running, a gear is engaged in the first subtransmission 4, and the second subtransmission 5 is in neutral. Next, load is transferred from the electric machine 2 to the internal combustion engine 1 via a second shift element 13 operating with slip at low travel speeds. Preferably there is a complete load reduction at the electric machine 2 so that the shift element 12 becomes load-free with respect to shift position A, so that shift position A can be disengaged load-free. Then, the shift element 12 is synchronized with respect to shift position B via the electric machine 2 preferably operating speed-regulated, wherein then the shift position B can be engaged load-free at the first shift element 12. Then load is preferably transferred from the internal combustion engine 1 to the electric machine 2, namely in that load is increased at the electric machine 2 and load is reduced at the internal combustion engine 1. The second shift element 13 becomes load-free due to the load reduction at the internal combustion engine 1. Then, the second shift element 13 is disengaged. Next, electric creeping can occur using the electric machine 2 operating as a motor, via a gear of the first subtransmission 4. The internal combustion engine 1 is decoupled because the shift position A is disengaged, and the second shift element 13 is disengaged and the second subtransmission 5 is engaged in neutral. The internal combustion engine 1 can be run idle or can be switched off.

A further method according to the invention, relates to shifting the first shift element 12 from the first shift position A into the second shift position B in creep operation of the drive train under load with the separating clutch 14 slipping intermittently. Creep mode here means that the travel speed of the drive train is so low that with an engaged separating clutch 14, the electrodynamic operation in the shift position A of the second shift element 14 cannot be bypassed, because otherwise the speed of the internal combustion engine 1 would be too low. An intermittently slipping separating clutch 14 can counteract this. Without the separating clutch 14, this shifting procedure at the shift element 12 can only occur with an interruption of tractive force.

The initial state for this method for shifting the shift element 12 from shift position A into the shift position B in creep operation under load with a separating clutch 14 slipping intermittently provides that the shift element 12 is engaged in position A, that the separating clutch 14 is engaged, that a gear is engaged in subtransmission 4, that the second subtransmission 5 is in neutral, and that the second shift element 13 is disengaged. Starting from this initial situation of the drive train, initially the separating clutch 14 is transferred into a slipping state by lowering the transfer capability thereof. Then, the rotational speed of the second transmission input shaft 7 is lowered to the rotational speed of the first transmission input shaft 6 such that the planetary gear set 8 can be in block rotation as a whole. The speed regulation required for this purpose can occur using regulation of the torque of the electric machine 2 as well as the torque transferred by the separating clutch 14. Next, the second shift element 13 is engaged or alternatively a gear is engaged in the second subtransmission 5. In order to engage a gear in the second subtransmission 5 the speed of the second transmission input shaft 7 must be synchronized to the gear in the second subtransmission 5, thus the planetary gear set 8 must abandon block rotation as a whole. After the second shift element 13 has been engaged, or a gear has been engaged in the second subtransmission 5, the load can be reduced at the electric machine 2. Subsequently, the load is adjusted at the internal combustion engine 1 and at the separating clutch 14 in order to guarantee an approximately constant drive torque at the transmission output shaft 15. In the process, the torque of the internal combustion engine 1 and the torque transferred by the separating clutch 14 are preferably increased, because the transmission ratio of the planetary gear set 8 is no longer effective. However, if the separating clutch 14 were loaded too strongly, the torque of the internal combustion engine 1 is not increased, and instead a reduction of the tractive force at the transmission output shaft 15 is accepted. As soon as the electric machine 2 is load-free, shift position A can be disengaged load-free at shift element 12, the shift element 12 is synchronized with respect to shift position B by a speed regulation of electric machine 2, and then shift position B is engaged. When the second shift element 13 is engaged, the second shift position B is already synchronous, and a possibly present tooth-on-tooth position can be resolved by changing the speed of the electric machine 2.

Next, the electric machine 2 takes over the drive torque in that load builds up at the electric machine 2. Then, the load at the internal combustion engine 1 is reduced. The shift element 13 can then be disengaged again, or the gear in the second subtransmission 5 can be disengaged. The separating clutch 14 can be disengaged or engaged. The internal combustion engine 1 supports the output torque either via the second subtransmission 5 with a disengaged shift element 13 or via the subtransmission 4 with an engaged shift element 13, while the shift element 12 is shifted load-free between shift position A and shift position B. In the process, the separating clutch 14 is slipping at least intermittently.

A further method according to the invention, relates to shifting the first shift element 12 from the second shift position B into shift position A in creep mode of the drive train under load with the separating clutch 14 slipping intermittently, wherein creep mode here is understood to be a situation of the drive train in which the travel speed thereof is so low that the internal combustion engine 1 cannot drive in a fixed gear, because otherwise the speed of the internal combustion engine would be too low. This situation can be counteracted by an intermittently slipping separating clutch 14. In the case that there is no separating clutch 14, the shifting cannot occur without an interruption of tractive force. This shifting can be necessary when the electric energy store becomes too empty during purely electric creeping and a switch into electrodynamic creeping must occur.

The initial situation of the drive train in purely electric creeping is as follows, namely that the shift element 12 is engaged in shift position B, the separating clutch 14 is disengaged or engaged, a gear is engaged in the first subtransmission 4, the second subtransmission 5 is in neutral, and the second shift element 13 is disengaged. In the method according to the invention, initially with the separating clutch 14 engaged beforehand, the separating clutch is disengaged, or with the separating clutch 14 disengaged beforehand, the separating clutch is kept disengaged, then the second shift element 13 is engaged or alternatively a gear is engaged in the second subtransmission 5.

The synchronization of the second transmission input shaft of the second subtransmission that is necessary for engaging a gear, is performed either with a disengaged separating clutch 14 by synchronization in the gear set of the transmission, or via the internal combustion engine 1 by partially engaging the separating clutch 14. After engaging the second shift element 13 or engaging a gear in the second subtransmission 5, drive torque is transferred to the internal combustion engine 1 via the separating clutch 14 operated with slip, for which purpose the transfer capability of the separating clutch 14 is correspondingly increased. Load is reduced at the electric machine 2 simultaneously to the load increase at the internal combustion engine 1, wherein then the shift element 12 can be disengaged load-free from shift position B. Subsequently, the shift element 12 is synchronized with respect to shift position A by means of the speed-regulated electric machine 2, and shift position A can be engaged load-free. The electric machine 2 then supports so much torque that the drive torque from the internal combustion engine 1 is conducted via the separating clutch 14 and via the planetary gear set 8, and the second shift element 13 or the gear engaged in the second subtransmission 5 no longer transfers any load. During the reduction of load at the electric machine 2, the torque of the internal combustion engine 1 or the separating clutch 14 is adapted so that the drive torque acting at the transmission output shaft 15 remains approximately constant. The torque of the internal combustion engine 1 or the separating clutch 14 can be reduced, because the transmission ratio of the planetary gear set 8 is no longer effective. Subsequently, either the load-free shift element 13 is disengaged, or a gear is disengaged load-free in the second subtransmission 5. Then, the separating clutch 14 can be engaged when the speed of the second input shaft 7 of the second subtransmission 5 is synchronized to the speed of the internal combustion engine 1, thus when the separating clutch 14 is synchronized. This synchronization occurs by regulating the torque provided by the electric machine 2 and transferred by the separating clutch 14. When the separating clutch 14 is engaged, the desired shifting procedure is completed, and in shift position A creep operation can be provided electrodynamically with the electric machine 2 operated as a generator.

Figure 8:
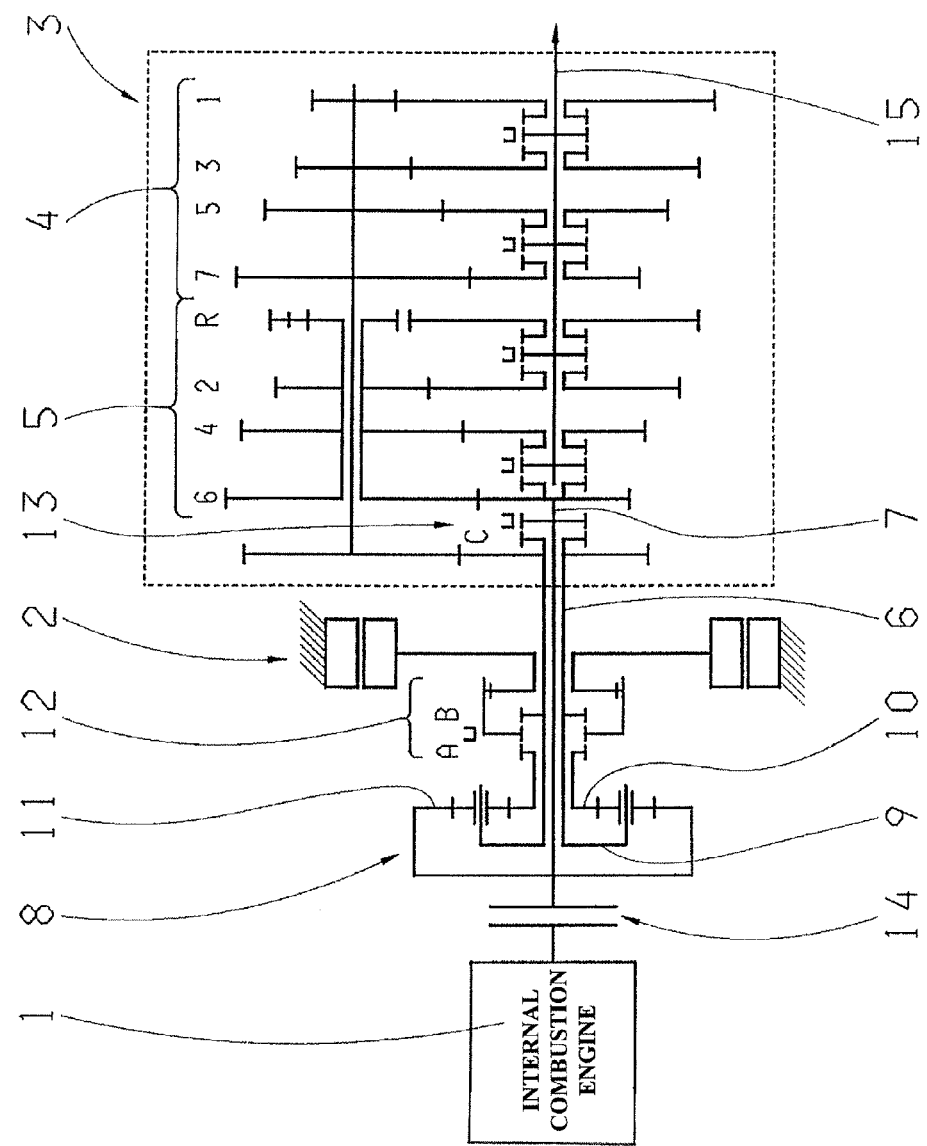
FIG. 8 a diagram of a drive train according to the invention with a device according to the invention according to an example embodiment of the second aspect of the invention.

FIG. 8 shows a diagram of a drive train according to the invention of a hybrid vehicle with a device according to the invention according to a second aspect of the invention.

The second aspect of the invention differs from the first aspect of the invention by the connection of the transmission input shafts 6 and 7 as well as the electric machine 2 to the elements 9, 10 and 11 of the planetary gear set 8. Thus, in the example embodiment of FIG. 8, a first element of the elements of the planetary gear set 8, namely in FIG. 8 the carrier 9, is in a fixed connection to the first transmission input shaft 6 of the first subtransmission 4 of the transmission 3. A second element of the elements of the planetary gear set 8, in FIG. 8 the ring gear 11, is in a fixed connection to the second transmission input shaft 7 of the second subtransmission 5 of the transmission 3, wherein the internal combustion engine 1 of the hybrid drive can be coupled to the second transmission input shaft 7. In FIG. 8, the optional separating clutch 14 is present.

Again in FIG. 8, there are two shift elements 12 and 13, wherein the electric machine 2 is coupled via the first shift element 12 in a first shift position A thereof to a third element of the elements of the planetary gear set 8, namely in FIG. 8 to the sun gear 10. In a second shift position B of the first shift element 12, the electric machine 2 is coupled to the first transmission input shaft 6 of the first subtransmission 4, so that the planetary gear set 8 runs along idle, or without torque. In the first shift position A, the planetary gear set 8 is again used as a superposition transmission in an EDS operating mode. In the second shift position B, an ISG operating mode is provided, wherein however in contrast to the example embodiments of FIGS. 1 to 7 of the first aspect of the invention, in the second aspect of the invention according to FIG. 8 the planetary gear set runs idle and thus does not transfer any torque.

In FIG. 8, the electric machine 2 can be shifted via the shift element 12 between the sun gear 10 of the planetary gear set 8 and the first transmission input shaft 6 of the first subtransmission 4, wherein the first transmission input shaft 6 of the first subtransmission 4 is in a fixed coupling to the carrier 9, and the second transmission input shaft 7 of the second subtransmission 5 is in a fixed coupling to the ring gear 11 of the planetary gear set 8.

The connection of the two transmission input shafts 6 and 7 as well as the electric machine 2 to the planetary gear set 8 can differ from FIG. 8, in that the electric machine is positioned so as to be switchable between the ring gear and the first transmission input shaft of the first subtransmission, that the first transmission input shaft is in fixed engagement with the carrier, and that the second transmission input shaft is in fixed engagement with the sun gear of the planetary gear set.

In contrast to the variant of FIG. 8, a plus planetary gear set can also be used, wherein then preferably the transmission input shaft of the first subtransmission is in fixed connection to the ring gear, the transmission input shaft of the second subtransmission is in fixed connection to the carrier, and the electric machine can be switched between the sun gear and the first transmission input shaft of the first subtransmission.

The methods according to the invention described in the context of the first aspect of the present invention for the example embodiments of FIGS. 1 to 7 can also be used for the variant of FIG. 8 of the second aspect of the invention. With respect to the methods according to the invention, for the second aspect of the present invention, reference is made to the embodiments above for the first aspect of the invention and to the details of the second shift element 13. Furthermore, the variants with respect to the second shift element 13, as shown in FIGS. 1 to 7, can also be used with the second aspect of the invention.

REFERENCE CHARACTERS 1 internal combustion engine
2 electric machine
3 transmission
4 first subtransmission
5 second subtransmission
6 first transmission input shaft
7 second transmission input shaft
8 planetary gear set
9 carrier
10 sun gear
11 ring gear
12 first shift element
13 second shift element
14 separating clutch
15 transmission output shaft

The invention claimed is:

1. A device, for a drive train of a hybrid vehicle, comprising:
    a planetary gear set (8) comprising a carrier (9), a sun gear (10) and a ring gear (11), a first element (9, 10 or 11) of the planetary gear set serving for establishing a fixed connection to a first transmission input shaft (6) of a first subtransmission (4) of a transmission, and a second element (9, 10 or 11) of the planetary gear set serving for establishing a fixed connection to an electric machine (2) of a hybrid drive,
    a third element (9, 10 or 11) of the planetary gear set being connectable, via a first shift position (A) of a first shift element (12), to a second transmission input shaft (7) of a second subtransmission (5) of the transmission to which further an internal combustion engine (1) of the hybrid drive being connectable,
    the third element (9, 10 or 11) being connectable, via a second shift position (B) of the first shift element (12), to another of the second and the third elements (9, 10 or 11) of the planetary gear set,
    a second shift element (13), and
    when the second shift element (13) is engaged, both the first and the second transmission input shafts (6, 7) of the first and the second subtransmissions (4, 5) being coupled together, and when the second shift element (13) is disengaged, both of the first and the second transmission input shafts (6, 7) of the first and the second subtransmissions (4, 5) being separated from one another.

2. The device according to claim 1, wherein the planetary gear set (8), in the first shift position (A) of the first shift element (12) in a first operating mode, serves as a superposition transmission, and
    in the second shift position (B) in a second operating mode, is bypassed in block rotation as a whole.

3. The device according to claim 1, wherein in a third, disengaged shift position of the first shift element (12), the third element of the planetary gear set (8) is freely rotatable.

4. The device according to claim 1, wherein with the second shift element (13) engaged, the first element of the planetary gear set (8) is fixedly coupled to both the first and the second transmission input shafts (6, 7) of the first and the second subtransmissions (4, 5), where in contrast with the second shift element (13) disengaged, the first element of the planetary gear set (8) is fixed coupled only to the first transmission input shaft (6) of the first subtransmission (4).

5. A drive train, of a hybrid vehicle having a hybrid drive, comprising:
    an internal combustion engine (1), an electric machine (2), and a transmission (3) comprising first and second subtransmissions (4, 5) being connected in parallel with one transmission input shaft (6, 7) per subtransmission,
    a planetary gear set (8) comprising a carrier (9), a sun gear (10) and a ring gear (11), a first element (9, 10 or 11) of the planetary gear set serving for establishing a fixed connection to a first transmission input shaft (6) of the first subtransmission (4) of a transmission, and a second element (9, 10 or 11) of the planetary gear set serving for establishing a fixed connection to the electric machine (2) of the hybrid drive,
    a third element (9, 10 or 11) of the planetary gear set being connectable, via a first shift position (A) of a first shift element (12), to a second transmission input shaft (7) of the second subtransmission (5) of the transmission, to which further an internal combustion engine (1) of the hybrid drive is connectable, and, via a second shift position (B) of the first shift element (12), being connectable to another element (9, 10 or 11) of the planetary gear set,
    a second shift element (13), and
    when the second shift element (13) is engaged, both the first and the second transmission input shafts (6, 7) of the first and the second subtransmissions (4, 5) being coupled together, and when the second shift element (13) is disengaged, both of the first and the second transmission input shafts (6, 7) of the first and the second subtransmissions (4, 5) being separated from one another.

6. The drive train according to claim 5, wherein the second transmission input shaft (7) of the second subtransmission (5) is coupled to the internal combustion engine (1) either without a clutch or by a separating clutch (14).

7. The drive train according to claim 5, wherein a method for operating the device comprises:
    either when the second shift element (13) is engaged and a gear is engaged in the first subtransmission (4), or when the second shift element (13) is disengaged and a gear is engaged in the second subtransmission (5), for shifting the first shift element (12) from the second shift position (B) into the first shift position (A), firstly, making the electric machine (2) completely load-free and the load thereof is at least partially transferred to the internal combustion engine (1), after that the second shift position (B) is disengaged load-free, and then the first shift position (A), after synchronization of the first shift element (12) with respect to the first shift position (A) using the electric machine (2), is engaged load-free, wherein the internal combustion engine (1) provides torque to a transmission output shaft (15) of the transmission (3), with the second shift element (13) engaged via the first subtransmission (4), and with the second shift element (13) disengaged via the second subtransmission (5).

8. The drive train according to claim 5, wherein a method for operating the device comprises:
when the second transmission input shaft (7) of the second subtransmission (5) is coupled to the internal combustion engine (1) via a frictionally engaging separating clutch (14) that is operable with slip, for shifting the first shift element (12) from the first shift position (A) into the second shift position (B) with an initially completely engaged separating clutch (14), with an initially disengaged second shift element (13), with a gear initially engaged in the first subtransmission (4) and with the second subtransmission (5) initially in neutral, firstly, operating the separating clutch (14) with slip and a rotational speed of the second transmission input shaft (7) is made to approach a speed of the first transmission input shaft (6), then either the second shift element (13) is engaged or a gear is engaged in the second subtransmission (5), after that load is reduced at the electric machine (2), then the first shift position (A) is disengaged, and subsequently, the second shift position (B), after synchronization of the first shift element (12) with respect to the second shift position (B) using the electric machine (2), is engaged.

9. The drive train according to claim 5, wherein a method for operating the device comprises:
when the second transmission input shaft (7) of the second subtransmission (5) is coupled to the internal combustion engine (1) via a frictionally engaging separating clutch (14) that is operable with slip, for shifting the first shift element (12) from the second shift position (B) into the first shift position (A) with an initially disengaged second shift element (13), with a gear initially engaged in the first subtransmission (4), and with the second subtransmission (5) initially in neutral, firstly, either disengaging or maintaining disengagement of the separating clutch, then either the second shift element (13) is engaged or a gear is engaged in the second subtransmission (5), after that with the separating clutch (14) operated with slip, load builds up at the internal combustion engine (1) and load is reduced at the electric machine (2), then the second shift position (B) is disengaged, and subsequently the first shift position (A), after synchronization of the first shift element (12) with respect to the first shift position (A) using the electric machine (2), is engaged.

10. The drive train according to claim 5, wherein a method for operating the device comprises:
when the second shift element (13) is implemented as a frictionally engaging shift element that is operable with slip, for shifting the first shift element (12) from the second shift position (B) into the first shift position (A) without interruption of tractive force with an initially disengaged second shift element (13), firstly, making the electric machine (2) completely load-free and the load thereof is completely transferred to the internal combustion engine (1) via the second shift element (13), which for this purpose is at least partially engaged and is operable with slip, after that the second shift position (B) is disengaged load-free, then using the electric machine (2) the first shift element (12) is synchronized with respect to the first shift position (A) and then the first shift position (A) is engaged load-free, load then is increased at the electric machine (2) and load is reduced at the internal combustion engine (1), such that the second shift element (13) becomes load-free and subsequently is disengaged.

11. The drive train according to claim 5, wherein a method for operating the device comprises:
when the second shift element (13) is implemented as a frictionally engaging shift element that is operable with slip, for shifting the first shift element (12) from the first shift position (A) into the second shift position (B) without interruption of tractive force with an initially disengaged second shift element (13), firstly, making the electric machine (2) completely load-free and the load thereof is completely transferred to the internal combustion engine (1) via the second shift element (13), which for this purpose is at least partially engaged and is operated with slip, after that the first shift position (A) is disengaged load-free, then using the electric machine (2) the first shift element (12) is synchronized with respect to the second shift position (B), and then the second shift position (B) is engaged load-free, load is then increased at the electric machine (2) and load is reduced at the internal combustion engine (1), such that the second shift element (13) becomes load-free and subsequently is disengaged.

12. A method of operating a device, for a drive train of a hybrid vehicle, which comprises a planetary gear set (8) including a carrier (9), a sun gear (10) and a ring gear (11), a first element (9, 10 or 11) of the planetary gear set serving for establishing a fixed connection to a first transmission input shaft (6) of a first subtransmission (4) of a transmission, and a second element (9, 10 or 11) of the planetary gear set serving for establishing a fixed connection to an electric machine (2) of the hybrid drive, a third element (9, 10 or 11) of the planetary gear set being connectable, via a first shift position (A) of a first shift element (12), to a second transmission input shaft (7) of a second subtransmission (5) of the transmission to which further an internal combustion engine (1) of the hybrid drive is connectable, the third element (9, 10 or 11) being connectable, via a second shift position (B) of the first shift element (12), to another of the second and the third elements (9, 10 or 11) of the planetary near set, a second shift element (13), and when the second shift element (13) is engaged, both the first and the send transmission input shafts (6, 7) of the first and the second subtransmissions (4, 5) are coupled together, and when the second shift element (13) is disengaged, both of the first and the second transmission input shafts (6, 7) of the first and the second subtransmissions (4, 5) are separated from one another, the method comprising:
firstly, making the electric machine (2) completely load-free either when the second shift element (13) is engaged and a gear is engaged in the first subtransmission (4), or when the second shift element (13) is disengaged and a gear is engaged in the second subtransmission (5), for shifting the first shift element (12) from the first shift position (A) into the second shift position (B), and
at least partially transferring the load thereof to the internal combustion engine (1), after that the first shift position (A) is disengaged load-free, and subsequently engaging load-free the second shift position (B), after synchronization of the first shift element (12) with respect to the second shift position (B) using the electric machine (2), and
providing torque, via the internal combustion engine (1), at a transmission output shaft (15) of the transmission (3), with the second shift element (13) engaged via the first subtransmission (4), and with the second shift element (13) disengaged via the second subtransmission (5).

13. The method for operating the device according to claim 12, either when the second shift element (13) is engaged and a gear is engaged in the first subtransmission (4), or when the second shift element (13) is disengaged and a gear is engaged in the second subtransmission (5), for shifting the first shift element (12) from the second shift position (B) into the first shift position (A), firstly, making the electric machine (2) completely load-free and the load thereof is at least partially transferred to the internal combustion engine (1), after that the second shift position (B) is disengaged load-free, and then the first shift position (A), after synchronization of the first shift element (12) with respect to the first shift position (A) using the electric machine (2), is engaged load-free, wherein the internal combustion engine (1) provides torque to a transmission output shaft (15) of the transmission (3), with the second shift element (13) engaged via the first subtransmission (4), and with the second shift element (13) disengaged via the second subtransmission (5).

14. The method for operating the device according to claim 12, wherein when the second transmission input shaft (7) of the second subtransmission (5) is coupled to the internal combustion engine (1) via a frictionally engaging separating clutch (14) that is operable with slip, for shifting the first shift element (12) from the first shift position (A) into the second shift position (B) with an initially completely engaged separating clutch (14), with an initially disengaged second shift element (13), with a gear initially engaged in the first subtransmission (4) and with the second subtransmission (5) initially in neutral, firstly, operating the separating clutch (14) with slip and a rotational speed of the second transmission input shaft (7) is made to approach a speed of the first transmission input shaft (6), then either the second shift element (13) is engaged or a gear is engaged in the second subtransmission (5), after that load is reduced at the electric machine (2), then the first shift position (A) is disengaged, and subsequently, the second shift position (B), after synchronization of the first shift element (12) with respect to the second shift position (B) using the electric machine (2), is engaged.

15. The method for operating a device according to claim 12, wherein when the second transmission input shaft (7) of the second subtransmission (5) is coupled to the internal combustion engine (1) via a frictionally engaging separating clutch (14) that is operable with slip, for shifting the first shift element (12) from the second shift position (B) into the first shift position (A) with an initially disengaged second shift element (13), with a gear initially engaged in the first subtransmission (4), and with the second subtransmission (5) initially in neutral, firstly, either disengaging or maintaining disengagement of the separating clutch, then either the second shift element (13) is engaged or a gear is engaged in the second subtransmission (5), after that with the separating clutch (14) operated with slip, load builds up at the internal combustion engine (1) and load is reduced at the electric machine (2), then the second shift position (B) is disengaged, and subsequently the first shift position (A), after synchronization of the first shift element (12) with respect to the first shift position (A) using the electric machine (2), is engaged.

16. The method for operating the device according to claim 12, wherein when the second shift element (13) is implemented as a frictionally engaging shift element that is operable with sop, for shifting the first shift element (12) from the second shift position (B) into the first shift position (A) without interruption of tractive force with an initially disengaged second shift element (13), firstly, making the electric machine (2) completely load-free and the load thereof is completely transferred to the internal combustion engine (1) via the second shift element (13), which for this purpose is at least partially engaged and is operable with slip, after that the second shift position (B) is disengaged load-free, then using the electric machine (2) the first shift element (12) is synchronized with respect to the first shift position (A) and then the first shift position (A) is engaged load-free, load then is increased at the electric machine (2) and load is reduced at the internal combustion engine (1), such that the second shift element (13) becomes load-free and subsequently is disengaged.

17. The method for operating the device according to claim 12, wherein when the second shift element (13) is implemented as a frictionally engaging shift element that is operable with slip, for shifting the first shift element (12) from the first shift position (A) into the second shift position (B) without interruption of tractive force with an initially disengaged second shift element (13), firstly, making the electric machine (2) completely load-free and the load thereof is completely transferred to the internal combustion engine (1) via the second shift element (13), which for this purpose is at least partially engaged and is operated with slip, after that the first shift position (A) is disengaged load-free, then using the electric machine (2) the first shift element (12) is synchronized with respect to the second shift position (B), and then the second shift position (B) is engaged load-free, load is then increased at the electric machine (2) and load is reduced at the internal combustion engine (1), such that the second shift element (13) preferably becomes load-free and subsequently is disengaged.

* * * * *